Patented Aug. 8, 1944

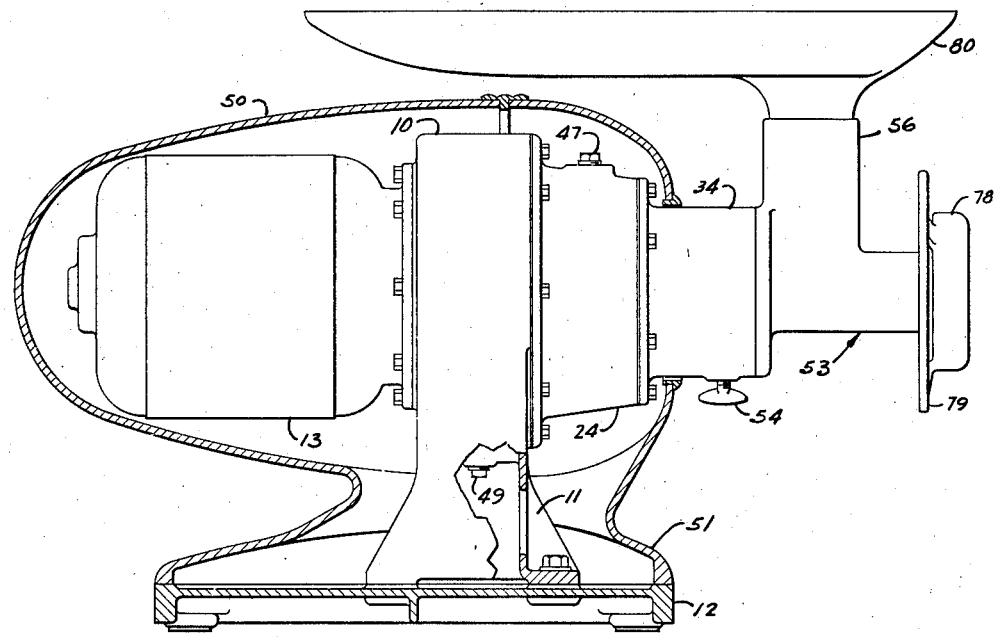
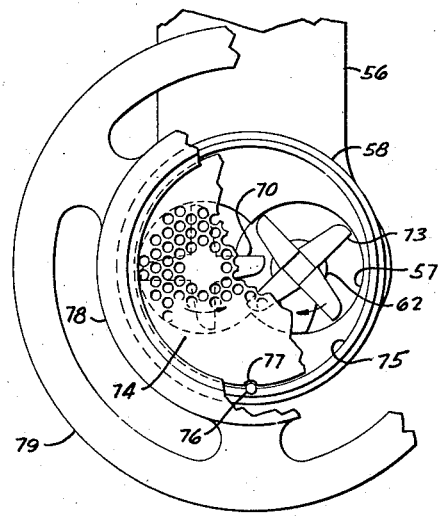
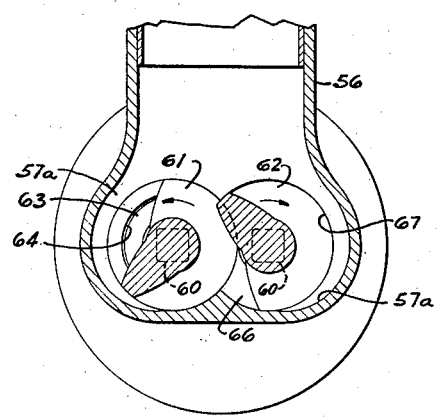

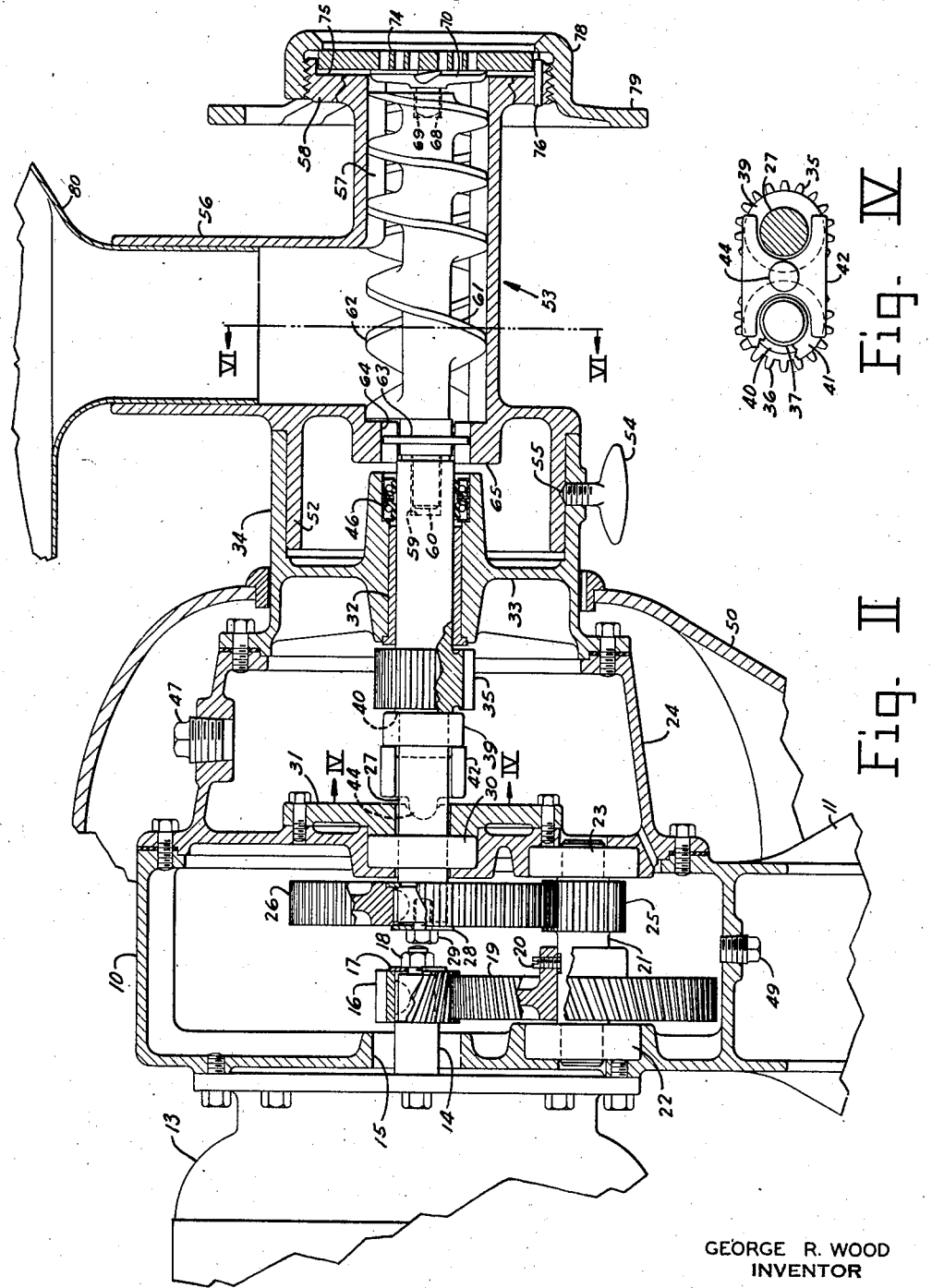

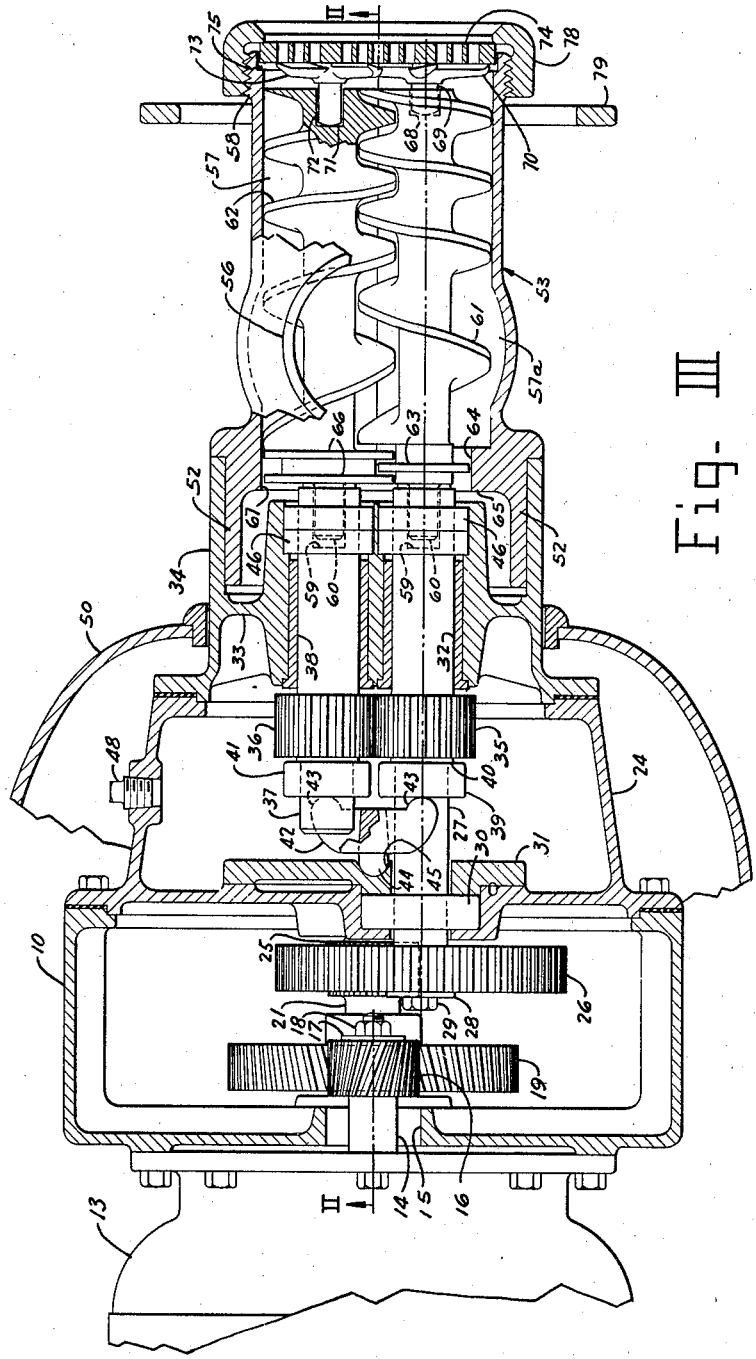

2,355,355

UNITED STATES PATENT OFFICE 2,355,355

FOOD HANDLING APPARATUS

George R. Wood, Montreal, Quebec, Canada, assignor to Toledo Scale Company, Toledo, Ohio, a corporation of New Jersey Application April 11, 1942, Serial No. 438,610

10 Claims. (Cl. 146—182)

This invention relates to food handling apparatus of the type employed to comminute or chop commodities such as meat.

The usual meat chopping machine employs a worm for feeding the meat from the feeding trough or tube through a chamber and against the inner surface of a perforated plate. The pressure on the meat, created by the feeding worm and external pressure applied by means of a tamper to the meat being fed, forces the meat tightly against the inner face of the perforated plate and causes small protuberances of the meat to extend into and through the perforations in the plate. A rotary knife is located so that its blades sweep over either the inner or outer face of the plate and slice off small nodules of meat which are extruded through the perforated holes by the aforementioned pressure. Repetition of this operation causes the successive severed nodules of meat to follow each other through the perforations and the machine emits tendrils of ground meat.

In order to secure greater pressure and to cause the meat to be positively fed through the chamber by the worm the inner walls of the chamber are usually convoluted having longitudinally extending flutes with sharpened edges. The clear diameter between the sharpened edges of the flutes is slightly larger than the maximum diameter of the worm threads. The sharpened edges of the flutes "snag" the meat being fed by the worm and create back pressure against it which causes it to be fed forwardly by the worm screws. Such portions of meat however as enter the threads of the worm do not come into contact with these sharpened flutes and remain in the thread of the worm, revolving around the worm as the worm rotates. This is particularly true of meat receiving a second cut since it is already somewhat doughy in consistency and more readily enters the space between the threads.

The action of the sharpened flutes on the meat has a tendency to rend or tear the meat fibers apart which forces the meat juices out of the fibers and lessens the natural flavor and nutritional content of the meat.

In order to overcome these disadvantages, that is, to create a greater pressure on the meat being fed in the chamber and to do away with the necessity of the sharpened flute and thus eliminate the rending action thereof, machines have been designed which employ two intermeshed feeding worms. In such a machine it is not necessary that the interior surface of the feeding chamber be convoluted or have sharpened flutes because the worms themselves, being intermeshed, carry the meat through the chamber with a positive feeding action. Since the fluted interior of the worm chamber is eliminated, the meat is not torn or rent but is cut apart by the rotary knives passing over the surface of the perforated extruding plate.

Another advantage which accrues from the use of dual intermeshed feeding worms and the elimination of the fluted chamber arises from the fact that in the single worm machines a sizeable proportion of the meat fed through the device remains in the threads of the worm and between the convolutions in the wall of the chamber. In the single worm devices a sufficient quantity of meat, particularly during second cuts, is left behind to spoil the quality of a successive grind, i. e., if a cheap grade is first chopped and this is followed by a higher grade of meat the second chopped product will contain perhaps fifteen or twenty per cent of the first chopped product which the second chopping operation has forced out of the machine.

However there arise some disadvantages from double worm machines. One of these is the fact that, since a separate rotary knife is usually driven by each of the worms, when these knives are sharpened they must both be sharpened the same amount so that the longitudinal space in the worm chamber which they occupy will be the same and the worms will not move relatively longitudinally and bind.

Furthermore, since the meat being fed into the feeding chamber of the device during a first cut is in relatively large pieces, it may be hard for these pieces to get started in between the worms and they may have a tendency to ride the upper surface of the worm threads unless forced therebetween by outside pressure.

It is an object of this invention to provide a double intermeshed worm feed for meat choppers in which the two rotary cutting knives employed may be sharpened independently of each other and any difference in resulting thickness does not affect the operation of the device.

It is another object of this invention to provide means for equalizing varying pressures on the worms of a dual intermeshed worm meat chopper caused by uneven sharpening of knives or cutting plates.

It is another object of this invention to provide a machine for chopping meat which will positively take ahold of relatively large pieces of meat being fed therein and will positively feed such meat through its feeding chamber and the perforations to form ground or chopped meat.

More specific objects and advantages are apparent from the description, in which reference is had to the accompanying drawings illustrating a preferred form of device embodying the invention.

In the drawings:

Fig. I is a view in elevation of a device embodying the invention, the outside cover therefor being shown in section.

Fig. II is a fragmentary vertical sectional view of the driving and chopping portions of the device shown in Fig. I on a greatly enlarged scale, being taken substantially on the line II—II of Fig. III.

Fig. III is a fragmentary horizontal sectional view of that portion of the mechanism shown in Fig. II, taken substantially on the center line of the feeding worms.

Fig. IV is a detailed view in elevation, taken substantially on the line IV—IV of Fig. II.

Fig. V is a fragmentary detailed view, taken from the right side of Fig. II.

Fig. VI is a fragmentary vertical sectional view, taken substantially on the line VI—VI of Fig. II.

These specific drawings and the specific description that follows merely disclose and illustrate the invention and are not intended to impose limitations upon the claims.

A main gear housing 10 (Figs. I, II and III) has a downwardly extending foot 11 which is bolted to a horizontal base 12. A motor 13 is bolted to the left side of the gear housing 10 and its shaft 14 extends horizontally through an aperture 15 in the left wall of the housing 10. A helical pinion 16 is keyed on the inner end of the shaft 14 and secured thereto by means of a washer 17 and nut 18.

The pinion 16 is in mesh with a helical gear 19 which is secured, by means of a setscrew 20, on a jackshaft 21. The jackshaft 21 is journaled in a combination thrust and radial bearing 22 which is socketed in the left wall of the housing 10 and in a bearing 23 which is mounted in the lower portion of the flanged end wall of a second gear housing 24 bolted at the right of the gear housing 10. A spur pinion 25 is integral with the jackshaft 21 and is in mesh with a spur gear 26 keyed on the end of a stub shaft 27 and secured thereto by means of a washer 28 and screw 29. One end of the stub shaft 27 is journaled in a radial bearing 30 which is mounted in the flanged end of the gear housing 24 and held in place by a plate 31 bolted to the interior of the flanged wall of the housing 24. The other end of the shaft 27 is journaled in a sleeve bearing 32 which is located in a web 33 of a cylindrical support member 34 bolted in turn to the right side of the second gear housing 24. A spur gear 35 is cut on the shaft 27 and is in mesh with a similar spur gear 36 cut on a second stub shaft 37 which is mounted parallel to and on the same horizontal plane with the stub shaft 27, being journaled in a sleeve bearing 38 also mounted in the web 33 of the member 34.

A thrust bearing 39 (see also Fig. IV) is located on the stub shaft 27 adjacent a shoulder 40 which is cut therein alongside the gear 35. A similar thrust bearing 41 is similarly located on the stub shaft 37 alongside the gear 36. A substantially H shaped equalizer 42 is located between the stub shafts 27 and 37, each pair of legs thereof extending around one of the shafts. At the end of each of these legs a curved portion 43 bears against the outer race of the thrust bearing 39 or 41 and a spherically ended protuberance 44, which is located at the center of the cross arm of the H shaped equalizer 42, is socketed in a spherical depression 45 in the face of the plate 31.

A dual oil seal 46 surrounds each of the shafts 27 and 37, being located in the web 33 in the outermost ends of the bearings 32 and 38. One of the leathers in each of the oil seals 46 is turned to prevent the escape of oil from the housings 10 and 24 and the other leather in the oil seal is turned outwardly to prevent the ingress of any foreign matter into such gearing housings. An oil filling plug 47 (Fig. II) is screwed into a hole in the top of the gear housing 24 to allow oil to be poured into the housings. The level of the oil is tested by means of a testing plug 48 (Fig. III) located in the side of the housing 24, on approximately the center line thereof, and the oil is drained from the gear housings by means of a drain plug 49 (Fig. II) threaded into a hole in the bottom of the gear housing 10.

A two-piece cover 50 (Fig. I), which is preferably so styled as to give a pleasing appearance to the machine, covers the motor 13 and gear housings 10 and 24 and has a flared downwardly extending skirt 51 which rests on the base 12.

The inner surface of the wall of the cylindrical support member 34 is machined to receive the outer machined surface of a cylindrical portion 52 (Figs. II and III) of a worm housing 53 which housing is held in position by means of a wing nut 54 threaded through the wall of the member 34 and engaged in a depression 55 in the outer surface of the cylindrical portion 52.

The worm housing 53 comprises the cylindrical portion 52, a feeding tube 56 and a horizontally extending chamber 57. The chamber 57 consists of two cylindrical bores which are longitudinally intersecting and thus has an 8 shaped cross section (see Figs. V and VI). At the outermost end of the worm housing 53 (the right end in Figs. I, II and III) the housing has a circular flange 58 the periphery of which is threaded.

That portion of the chamber 57 which is located beneath the lower end of the feeding tube 56 is bulged outwardly on both sides of the chamber some distance from the outer edge of the worms 61 and 62 (see Figs. III and VI). As can be seen in Fig. VI, the space thus created at each side of the chamber 57 (designated by the reference numeral 57a) is on that side of each of the worms 61 and 62 toward which the top of the worm rotates. This allows lumps of material, which have entered the chamber 57 through the tube 56 and are resting on the top of the worms 61 and 62, to feed into the space 57a. The shape of the bulged portion is such that the space 57a narrows toward the bottom of the chamber and, on approximately the center lines of the worms, disappear entirely. Material carried into the space 57a is thus wedged into the space between the threads of the worms by the wall of the bulged portion of the chamber 57.

A squared socket 59 is cut in the ends of each of the stub shafts 27 and 37 and squared tenons 60 on the inner ends of feeding worms 61 and 62 are engaged in the sockets 59 of the shafts 27 and 37 respectively. The worms 61 and 62 are of opposite hands and rotate in opposite directions. Therefore, the two worms 61 and 62 must be inserted in the proper ones of the intersecting bores making up the chamber 57. To prevent the worms being inserted in the wrong side of the chamber 57 there is cut in the worm 61 a single disk 63 which rotates in a bore 64 cut in a boss 65 forming the end of the chamber 57, the bore 64 having the same diameter as the disk 63. A pair of disks 66 of larger diameter than the disk 63 are cut in the worm 62 and rotate in a bore 67 of the same diameter which intersects the bore 64 and is also located in the boss 65. When the worms are properly assembled the single disk 63 of the worm 61 is located between the disks 66 of the worm 62.

The pitch of the thread of the two worms 61 and 62 is the same and progressively gets less steep through the length of the worms from their innermost ends toward the ends of the worms which extend through the chamber 57. The axes of the worms are parallel and on the same horizontal plane and the axis of the feeding tube 56 is at right angles to this plane and located equidistantly between the axes of the worms.

A squared socket 68 is cut in the end of the worm 61 and is adapted to receive a squared shank 69 of a rotary four-bladed knife 70. A squared socket 71, in the end of the worm 62, is deeper than the socket 68 in the worm 61 and has a smaller cross section. A squared shank 72 of a second rotary knife 73 fits into the socket 71 of the worm 62. The two sockets 68 and 71, and the shanks of the knives 70 and 73 respectively, are different in order to prevent the knives from being incorrectly placed in the ends of the worms since the worms rotate in opposite directions and since (as can be seen in Figs. II and III) the knives are angular to their plane of rotation and must therefore rotate in the correct direction in order to operate properly. A plate 74 (see also Fig. V), which has a series of perforations covering an area equal to the area of the chamber 57, is located in a shouldered seat 75 which is cut in the outer face of the flange 58. The plate, when in the seat, is at right angles to the axes of the worms. A pin 76 extends through the flange 58 and into the edge of the seat 75 and is engageable in a notch 77 cut in the periphery of the plate 74 to correctly position the plate in the seat 75. The perforated plate 74 is pressed against the cutting edges of the knives 70 and 73 by a compression ring 78 which has a handwheel 79 and is adapted to be threaded on the threads cut in the periphery of the circular flange 58.

The operation of the device for chopping and comminuting meat is as follows: The meat to be ground is cut into pieces small enough to enter the feeding tube 56 and placed in a feeding tray or trough 80, the neck of which fits into the feeding tube 56. The meat, or other material, falls onto the upper surfaces of the worms 61 and 62, which are shown as being rotated in opposite directions, and is carried outwardly into the space 57a and then into the space between the steeply pitched thread of the inner end of the worms. The material is carried forward by the worms under gradually increasing pressure until it reaches the outer end of the chamber 57. The meat is forced against the inner surface of the perforated plate 74 and into the perforations therein. The rotary knives 70 and 73, which sweep over the inner surface of the plate, cut off the small nodules of meat thus formed. Continuation of this operation extrudes the meat through the plate 74.

When the knives 70 and 73 become dull, the compression ring and perforated plate are removed from the device and the knives removed, sharpened and reinserted in their respective sockets. It is also necessary to grind the inner surface of the plate 74 to remove the scoring which may be cut therein by the scraping action of the rotary knives. After repeated sharpening of the knives and grinding of the inner surface of the plate the space taken up by the knives decreases and the plate becomes thinner and, therefore, the plate must be held further in the seat 75. This is accomplished by tightening the compression ring 78 further on the flange 58.

The equalizer 42 absorbs the back thrust on the two worms which is created by the back pressure of the meat being fed down the chamber 57 and against the plate 74. If, during the sharpening of the knives, they are not sharpened to exactly the same amount this difference in the effective length of the worms and their respective stub shafts is compensated for by the rocking action of the equalizer. For example, if, during the sharpening, the knife 70 is ground down slightly further than the knife 73, when the plate 74 is compressed against the knives by the compression ring, the knife 73 and the worm 62 will be pushed further into the chamber 57 which by thrusting against the stub shaft 37 will rock the equalizer 42 and move the stub shaft 27, worm 61 and knife 70 out a little thus pressing both of the knives against the interior surface of the perforated plate 74 with equal pressure. The cross section of the threads of the worms is such that there is a small amount of play between the intermeshed threads to permit this compensation or equalization of pressure to take place. Without the equalizer, if one of the knives were ground off more than the other, when the compression ring 78 was tightened against the plate 74, the plate would be forced first against that one of the knives which was not ground off and would tilt in its seat. This, of course, would cause that knife to dig into the plate and would create a condition of unequal pressure in the device which would shortly lead to destruction of the knives and the plate.

All such inequalities in sharpening the knives and grinding the inner surface of the plate 74 are compensated for automatically by the rocking action of the equalizer 42 which moves one worm outwardly and allows the other to move inwardly when their effective length is unequal.

The embodiment of the invention that has been disclosed may be modified to meet various requirements.

Having described my invention, I claim:

1. In a device for comminuting meat, in combination, a chamber, a pair of intermeshed feeding worms in said chamber, a perforated plate across the discharge end of said chamber, a rotary knife socketed in the end of each of said worms and adapted to sweep over the surface of said plate, an a thrust and pressure equalizer rockingly mounted at the inner end of said chamber and acting on said worms for compensating for unequal thrusting pressure acting longitudinally on said knives and said worms.

2. In a device of the class described, in combination, a chamber having two longitudinally intersecting bores, a feeding worm rotatably journaled in each of said bores, the threads of said worms being intermeshed, means for synchronously rotating said worms in opposite directions, a rotary knife loosely socketed in the end of each of said worms, a perforated plate across said chamber at right angles to the axes of said worms and adapted to be forced against said knives, compression means for forcing said plate against said knives and an equalizer mounted in said chamber so as to act longitudinally against said worms for absorbing the force exerted by said plate against said knives and said worms and for equalizing such force between said knives and their respective worms.

3. In a device of the class described, in combination, a feeding chamber, a pair of intermeshed oppositely rotatable feeding worms located in said chamber, a rotary knife loosely socketed in the output end of each of said worms, a perforated plate adjustably mounted at the output end of said chamber at right angles to the axes of said worms, said knives when rotated being adapted to sweep over a face of said plate, means for pressing said plate against said knives, and a thrust equalizer pivotally mounted at the inner end of said chamber and acting on said worms for compensating for unequal pressures on said knives and on said worms.

4. In a device for comminuting meat, in combination, a feeding chamber, a pair of intermeshed oppositely rotatable feeding worms removably journaled in said chamber, driving mechanism including a pair of synchronously driven shafts one end of each of said shafts extending adjacent to one end of said chamber, one of said worms being socketed in each of said shafts, a rotary knife removably socketed in the opposite end of each of said worms, a perforated plate removably positioned across said chamber at right angles to the axes of said worms, said knives being held in said worms by pressure between the inner face of said plate and said knives, a compression ring for forcing said plate against said knives, said ring being adjustable longitudinally of said worms for moving said plate longitudinally of said worms to compensate for wear on said knives and said plate, and an equalizer pivotally mounted between the ends of said shafts opposite their connection with said worms and having two equal arms each of which engages one of said shafts for absorbing longitudinal thrust and, by rocking, for equalizing such thrust between said shafts.

5. In a device of the class described, in combination, a chamber having a pair of longitudinally intersecting parallel bores, a pair of intermeshed feeding worms each rotatably journaled in one of said bores, said chamber having an inlet and an outlet end, said worms being adapted to feed material from said inlet end to said outlet end, material comminuting means at the outlet end of said chamber, a pressure equalizer pivotally mounted at the inner end of said chamber for equalizing uneven pressures on said worms and a bulged section in said chamber at its inlet end for permitting material to be fed into said chamber around the ends of said worms located at the inlet end of said chamber.

6. In a device for comminuting meat, in combination, a chamber, a pair of intermeshed feeding worms rotatably journalled in said chamber, a perforated plate across the discharge end of said chamber, a rotary knife driven by each of said worms and adapted to sweep over a portion of the surface of said plate and a pressure equalizer pivoted at the inner end of said chamber acting through said worms on said knives for equalizing thrusts on said worms.

7. In a device for comminuting meat, in combination, a chamber, a pair of intermeshed feeding worms rotatably journalled in said chamber, a perforated plate across the discharge end of said chamber, a rotary knife driven by each of said worms and adapted to sweep over a portion of the surface of said plate and a thrust equalizer rockingly journalled at the inner end of said chamber and acting on the inner ends of said worms for equalizing thrusts transmitted to said worms from said knives.

8. In a device for comminuting meat, in combination a chamber, a pair of intermeshed feeding worms rotatably journalled in said chamber, a perforated plate across the discharge end of said chamber, a rotary knife driven by each of said worms and adapted to sweep over a portion of the surface of said plate and a thrust equalizer pivotally mounted at the inner end of said chamber and having two arms one of which is in thrust receiving relation to the inner end of each of said worms.

9. In a device for comminuting meat, in combination, a chamber, a pair of intermeshed feeding worms rotatably journalled in said chamber, a pair of synchronously driven shafts one end of each of said shafts extending adjacent to one end of said chamber, one of said worms being socketed in each of said shafts, a perforated plate across the discharge end of said chamber, a rotary knife driven by each of said worms and adapted to sweep over a portion of the surface of said plate and an equalizer pivotally mounted at the inner end of said chamber and having two arms each of which engages a different one of said shafts for absorbing longitudinal thrust and, by rocking, for equalizing such thrust between said shafts.

10. In a device for comminuting meat, in combination, a chamber having longitudinally intersecting bores, a plate disposed across one end of said chamber, said plate being perforated in the area adjacent said bores, a pair of knives adapted to be pressed against and rotate over the perforated portion of said plate, means for applying pressure against said knives to hold them against said plate including a pressure equalizer pivotally mounted in said chamber remote from said plate, means for rotating said knives, and means for feeding the material to be comminuted against said perforated plate.

GEORGE R. WOOD.